United States Patent
Patterson et al.

(10) Patent No.: US 10,694,257 B2
(45) Date of Patent: Jun. 23, 2020

(54) MULTICAST VIDEO PROGRAM SWITCHING ARCHITECTURE

(71) Applicant: TIME WARNER CABLE ENTERPRISES LLC, New York, NY (US)

(72) Inventors: Reuben Patterson, Denver, CO (US); James Panagos, Arvada, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 15/682,430

(22) Filed: Aug. 21, 2017

(65) Prior Publication Data
US 2018/0041818 A1 Feb. 8, 2018

Related U.S. Application Data

(62) Division of application No. 14/749,449, filed on Jun. 24, 2015, now Pat. No. 9,743,151.

(51) Int. Cl.
*H04N 7/173* (2011.01)
*H04N 7/16* (2011.01)
(Continued)

(52) U.S. Cl.
CPC ..... *H04N 21/6405* (2013.01); *H04L 61/2507* (2013.01); *H04L 67/02* (2013.01);
(Continued)

(58) Field of Classification Search
CPC .......... H04N 21/6405; H04N 21/2408; H04N 21/6175; H04N 21/64322; H04L 61/2507; H04L 67/02
See application file for complete search history.

(56) References Cited

U.S. PATENT DOCUMENTS 6,161,137 A 12/2000 Ogdon et al.
7,154,898 B1 12/2006 Pecus et al.
(Continued)

OTHER PUBLICATIONS

Katabi D., et al., "A Framework for Scalable Global IP-Anycast (GIA)", MIT Laboratory for Computer Science, 545 Technology Square, Cambridge, MA 02139, 2000, 13 Pages.
(Continued)

*Primary Examiner* — Kyu Chae
(74) *Attorney, Agent, or Firm* — Gazdzinski & Associates, PC

(57) ABSTRACT

Multicast video program switching architecture. In one embodiment, a user makes a request for service. A controller determines whether the channel is currently broadcast. When the channel is currently broadcast, redirect the user to an address of the channel. When the channel is not currently broadcast, query a storage apparatus to find a currently broadcast channel that has no current viewership, send, a request to a multicast network address translation (MNAT) router comprising a multicast address of the currently broadcast channel and an identifier of the requested channel to modify MNAT settings on the MNAT router and redirect the user to the multicast address, the multicast address associated with the requested channel.

20 Claims, 13 Drawing Sheets

(51) Int. Cl.

| | |
|---|---|
| *H04N 21/6405* | (2011.01) |
| *H04L 29/08* | (2006.01) |
| *H04N 21/61* | (2011.01) |
| *H04N 21/643* | (2011.01) |
| *H04N 21/24* | (2011.01) |
| *H04L 29/12* | (2006.01) |

(52) U.S. Cl.
CPC ..... *H04N 21/2408* (2013.01); *H04N 21/6175* (2013.01); *H04N 21/64322* (2013.01)

(56) References Cited

U.S. PATENT DOCUMENTS

| | | | |
|---|---|---|---|
| 7,602,820 | B2 | 10/2009 | Helms et al. |
| 7,954,131 | B2 | 5/2011 | Cholas et al. |
| 8,015,306 | B2 | 9/2011 | Bowman |
| 8,073,940 | B1 | 12/2011 | Richardson et al. |
| 8,301,776 | B2 | 10/2012 | Hebert et al. |
| 8,386,629 | B2 | 2/2013 | Tan et al. |
| 8,432,791 | B1 | 4/2013 | Masters |
| 8,510,826 | B1 | 8/2013 | Reams, III et al. |
| 8,713,623 | B2 | 4/2014 | Brooks |
| 8,997,136 | B2 | 3/2015 | Brooks et al. |
| 9,215,423 | B2 | 12/2015 | Kimble et al. |
| 9,350,706 | B1 | 5/2016 | Smith et al. |
| 2001/0018772 | A1* | 8/2001 | Shibata .................. H04N 21/21 725/93 |
| 2001/0049740 | A1 | 12/2001 | Karpoff |
| 2002/0059621 | A1 | 5/2002 | Thomas et al. |
| 2002/0116529 | A1 | 8/2002 | Hayden |
| 2003/0110509 | A1 | 6/2003 | Levinson et al. |
| 2003/0211839 | A1 | 11/2003 | Baum et al. |
| 2004/0010588 | A1 | 1/2004 | Slater et al. |
| 2004/0017769 | A1 | 1/2004 | Denecheau et al. |
| 2004/0039844 | A1 | 2/2004 | Bonn |
| 2005/0089050 | A1* | 4/2005 | Cheriton ................ H04L 12/18 370/397 |
| 2006/0050719 | A1 | 3/2006 | Barr et al. |
| 2006/0130113 | A1 | 6/2006 | Carlucci et al. |
| 2006/0190589 | A1 | 8/2006 | Parker et al. |
| 2006/0198394 | A1* | 9/2006 | Gotoh ................. H04L 12/1836 370/469 |
| 2007/0091793 | A1 | 4/2007 | Filsfils et al. |
| 2007/0101379 | A1 | 5/2007 | Pereira et al. |
| 2008/0115167 | A1* | 5/2008 | Hermsmeyer ...... H04L 67/1095 725/46 |
| 2008/0235746 | A1 | 9/2008 | Peters et al. |
| 2009/0083279 | A1 | 3/2009 | Hasek |
| 2009/0100459 | A1 | 4/2009 | Riedl et al. |
| 2009/0138601 | A1 | 5/2009 | Hebert et al. |
| 2009/0161674 | A1* | 6/2009 | Bou-Diab ............. H04L 12/185 370/390 |
| 2009/0260046 | A1 | 10/2009 | Yang |
| 2009/0313330 | A1 | 12/2009 | Sakamoto |
| 2010/0115565 | A1 | 5/2010 | Fujihira et al. |
| 2010/0128918 | A1 | 5/2010 | MacWan |
| 2010/0313223 | A1 | 12/2010 | Straub |
| 2010/0332595 | A1 | 12/2010 | Fullagar et al. |
| 2011/0103374 | A1 | 5/2011 | Lajoie et al. |
| 2011/0302600 | A1 | 12/2011 | Kelsen et al. |
| 2012/0023535 | A1 | 1/2012 | Brooks et al. |
| 2012/0110202 | A1 | 5/2012 | Niman |
| 2013/0018978 | A1 | 1/2013 | Crowe et al. |
| 2013/0044758 | A1 | 2/2013 | Nguyen et al. |
| 2013/0104180 | A1* | 4/2013 | Knightbridge ......... H04H 20/93 725/116 |
| 2013/0121339 | A1 | 5/2013 | Dispensa et al. |
| 2013/0159472 | A1 | 6/2013 | Newton et al. |
| 2013/0188645 | A1 | 7/2013 | Mack-Crane |
| 2013/0262697 | A1 | 10/2013 | Karasaridis et al. |
| 2013/0268856 | A1 | 10/2013 | Hejl, Jr. et al. |
| 2013/0318195 | A1 | 11/2013 | Kwapniewski et al. |
| 2014/0006158 | A1 | 1/2014 | Cooper |
| 2014/0036663 | A1 | 2/2014 | Narayanan |
| 2014/0164760 | A1 | 6/2014 | Hybertson et al. |
| 2014/0321561 | A1 | 10/2014 | Stec et al. |
| 2015/0003517 | A1* | 1/2015 | Misumi .............. H04N 21/2383 375/240.02 |
| 2015/0040173 | A1 | 2/2015 | Panagos et al. |
| 2015/0063249 | A1 | 3/2015 | Jover et al. |
| 2015/0074697 | A1 | 3/2015 | Van Vleck et al. |
| 2015/0271541 | A1 | 9/2015 | Gonder et al. |

OTHER PUBLICATIONS

Adams, et al., Protocol Independent Multicast-Dense Mode (PIM-DM): Protocol Specification (Revised), Jan. 2005.
Bhattacharyy, An Overview of Source-Specific Multicast, Jul. 2003.
Cain, et al., Internet Group Management Protocol, Version 3, Oct. 2002.
Deering et al., Internet Protocol, Version 6 (Ipv6) Specification, IETF RFC 2460 (Dec. 1998).
Fenner, et al., Internet Group Management Protocol (IGMP)/ Multicast Listener Discovery (MLD)-Based Multicast Forwarding (IGMP/MLD Proxying), IETF RFC 4605, Aug. 2006.
Handley, et al., Bidirectional Protocol Independent Multicast (BIDIR-PIM), Oct. 2007.
Holbrook, et al., Using Internet Group Management Protocol Version 3 (IGMPv3) and Multicast Listener Discovery Protocol Version 2 (MLDv2) for Source-Specific Multicast, Aug. 2006.
http://www.karlrupp.net/en/computer/nat_tutorial.
Internet Protocol DARPA Internet Program Protocol Specification, IETF RFC 791 (Sep. 1981).
Marques P., et al., "Advertisement of the Best External Route in BGP," 2012, pp. 1-21.
Mohapatra P., et al., "Fast Connectivity Restoration Using BGP Add-path," 2013, pp. 1-19.
Raszuk, R., et al., "Distribution of Diverse BGP Paths," RFC6774, 2012, pp. 1-22.
Vida, et al., Multicast Listener Discovery Version 2 (MLDV2) for IPv6, Jun. 2004.
Weiden F., et al., "Anycast as a Load Balancing Feature," USENIX, 2010, pp. 1-4.
Wing, et al., IP Multicast Requirements for a Network Address Translator (NAT) and a Network Address Port Translator (NAPT), IETF RFC 5135, Feb. 2008.

* cited by examiner

```
mysql> select * from info;
+----+-----------+-------+-----------+-----------------+------------------+----------------+--------------------------------+-----------------+--------------+------------+
| id | available | users | pub_point | mcast_src_source| mcast_src_group  | mcast_out_group| base_url                       | current_service | encoder      | resolution |
+----+-----------+-------+-----------+-----------------+------------------+----------------+--------------------------------+-----------------+--------------+------------+
|  1 | 0         | 1     | PEG_1     | 69.76.92.108    | 239.194.10.135   | 239.123.0.1    | http://pegs.timewarnercable.com | YNWSRC_SD       | 10.159.2.159 | SD         |
|  2 | 0         | 2     | PEG_2     | 107.14.30.219   | 239.195.44.189   | 239.123.0.2    | http://pegs.timewarnercable.com | ABNGOV_SD       | 10.159.2.159 | SD         |
|  3 | 0         | 1     | PEG_3     | 69.76.96.8      | 239.195.82.46    | 239.123.0.3    | http://pegs.timewarnercable.com | CC_HD           | 10.159.2.159 | SD         |
|  4 | 0         | 1     | PEG_4     | 24.174.114.17   | 239.195.55.21    | 239.123.0.4    | http://pegs.timewarnercable.com | TEXAS_ASCC_SD   | NULL         | NULL       |
|  5 | 1         | 0     | PEG_5     |                 |                  | 239.123.0.5    | http://pegs.timewarnercable.com |                 |              |            |
|  6 | 1         | 0     | PEG_6     |                 |                  | 239.123.0.6    | http://pegs.timewarnercable.com |                 |              |            |
|  7 | 1         | 0     | PEG_7     |                 |                  | 239.123.0.7    | http://pegs.timewarnercable.com |                 |              |            |
|  8 | 1         | 0     | PEG_8     |                 |                  | 239.123.0.8    | http://pegs.timewarnercable.com |                 |              |            |
|  9 | 1         | 0     | PEG_9     |                 |                  | 239.123.0.9    | http://pegs.timewarnercable.com |                 |              |            |
| 10 | 1         | 0     | PEG_10    |                 |                  | 239.123.0.10   | http://pegs.timewarnercable.com |                 |              |            |
| 11 | 1         | 0     | PEG_11    |                 |                  | 239.123.0.11   | http://pegs.timewarnercable.com |                 |              |            |
| 12 | 1         | 0     | PEG_12    |                 |                  | 239.123.0.12   | http://pegs.timewarnercable.com |                 |              |            |
| 13 | 1         | 0     | PEG_13    |                 |                  | 239.123.0.13   | http://pegs.timewarnercable.com |                 |              |            |
| 14 | 1         | 0     | PEG_14    |                 |                  | 239.123.0.14   | http://pegs.timewarnercable.com |                 |              |            |
+----+-----------+-------+-----------+-----------------+------------------+----------------+--------------------------------+-----------------+--------------+------------+
14 rows in set (0.00 sec)
```

MULTICAST VIDEO PROGRAM SWITCHING ARCHITECTURE

PRIORITY AND RELATED APPLICATIONS

This application is a divisional of and claims priority to co-owned U.S. patent application Ser. No. 14/749,449 of the same title filed Jun. 24, 2015, and issuing as U.S. Pat. No. 9,743,151 on Aug. 22, 2017, which is incorporated herein by reference in its entirety. In addition, the present application is related to co-owned U.S. patent application Ser. No. 13/958,467 filed on Aug. 2, 2013, entitled "PACKETIZED CONTENT DELIVERY APPARATUS AND METHODS", and issued as U.S. Pat. No. 9,467,369 on Oct. 11, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, and/or audio) over data delivery networks, such as an Internet Protocol Television (IPTV) network, and/or the Internet; and specifically in one aspect to a multicast video program switching architecture.

2. Description of Related Technology

Local television networks comprise over 2,000 channels and there are an additional 1,188 Public, Education, and Governmental (PEG) Access Channels. These channels are rarely consumed but in some cases are mandated to be carried by networks.

As content providers move toward digital distribution of content, content distribution networks are deciding whether to handle PEG content to digital distribution which may require the expenditure and operation of a large number of digital video hardware (e.g., encoders) for providing these rarely (and sometimes never) watched channels. By some estimates, total view time of PEG channels is 0.0004% of the total view time. During operation, even when not being viewed, the encoders processing these services are consuming power, cooling, and bandwidth in a datacenter.

Solutions exist that require the management of individual encoders and publishing points on origins for each service. This content is being consumed from digital content management apparatus, such as Digital Content Managers (DCM) by Cisco®, and published to origins in an always-on fashion that makes management complex due to the volume of content. Unfortunately, the ability to monitor the current state of the vast number of local and PEG channels is diminished and therefore if an issue arises it is likely customer-facing and would be corrected only when a customer calls to report the issue.

Based on the foregoing, it is clear that while prior art solutions have generally recognized the benefits of digital video distribution, various limitations, including bandwidth, power, licensing, cooling, and technical limitations, pose a great expense for these distribution networks to distribute this rarely consumed content. Solutions would ideally be encoder agnostic, use standardized hardware/software/operating systems, and be able to be implemented quickly with low development and resource overhead.

SUMMARY

The present disclosure addresses the foregoing needs by providing, inter alia, a multicast video program switching architecture.

In a first aspect, a controller apparatus is disclosed. In one embodiment the apparatus comprises: a storage apparatus having data associated with current channel viewership associated with a plurality of programming channels stored therein; a first interface to a network; a second interface in signal communication with a content delivery network (CDN); a third interface in signal communication with a multicast network address translation (MNAT) router; and a processor configured to execute at least one computer program, the at least one computer program comprising a plurality of instructions. The plurality of instruction are configured to, when executed, cause the apparatus to: receive a request for a channel from a user via the first interface; determine whether the channel is currently broadcast on the CDN; when the channel is currently broadcast, redirect the user to an address of the channel; and when the channel is not currently broadcast: query the storage apparatus to find a currently broadcast channel that has no current viewership; send, via the third interface, a request to the MNAT router comprising a multicast address of the currently broadcast channel and an identifier of the requested channel to modify MNAT settings on the MNAT router; and redirect the user to the multicast address, the multicast address associated with the requested channel.

In an embodiment, the storage apparatus comprises a database configured to store channel state information. In another embodiment, the currently broadcast channel that has no current viewership comprises a source specific multicast (SSM) address. In such an embodiment, the request to modify MNAT settings comprises association of the SSM address with a source address associated with the channel. In an additional embodiment redirection comprises submission of an Hypertext Transfer Protocol (HTTP) redirect to the user. In such an embodiment the HTTP redirect comprises an HTTP 302 redirect. In a further embodiment the plurality of instructions are further configured to, when executed, cause the apparatus to: receive refreshed data associated with the current channel viewership from the CDN via the second interface, the refreshed data comprising more temporally relevant data associated with the current viewership level than the data associated with the current channel viewership and store the refreshed data in the storage apparatus.

In a second aspect, a method of operating a router in a content network is disclosed. In an embodiment the method comprises: maintaining a routing table between at least two networks comprising a source network and an encoding network; maintaining a network address translation (NAT) table to translate a plurality of addresses in the source network to a plurality addresses in the encoding network; receiving a request from a video controller to modify the NAT table by modifying a source address associated with a source associated with the source network to translate to a different encoding address associated with the encoding network, the source having at least one requesting viewer and the different encoding address currently associated with a different source having no current viewership and with reception at an encoder associated with the encoder network; and modifying the NAT table in response to the request.

In an embodiment the modifying the NAT table effectuates a switching of content received by the encoder from the different source to the source without modifying the encoder. In an additional embodiment, the source and the different source are associated with different public, educational and/or government access (PEG) channels. In a further embodiment, each of the plurality of addresses in the source network, the plurality of addresses in the encoding network, the source address, and the different encoding address comprise different multicast addresses. In such an embodiment, the NAT table comprises a multicast NAT (MNAT) table. Furthermore, in an embodiment, the source network comprises a first Internet Group Management Protocol (IGMP) router and the encoding network comprises a second IGMP router, wherein the router acts as a proxy between the first and second IGMP routers. Furthermore, in an embodiment, the source comprises a digital content management apparatus.

In a third aspect, a non-transitory computer readable apparatus is disclosed. The computer readable apparatus comprises one or more instructions which when executed causes a processor to: store data associated with current channel viewership associated with a plurality of programming channels; receive a request for a channel from a user via the first interface; determine whether the channel is currently broadcast on the CDN; when the channel is currently broadcast, redirect the user to an address of the channel; and when the channel is not currently broadcast: query the storage apparatus to find a currently broadcast channel that has no current viewership; send, via the third interface, a request to the MNAT router comprising a multicast address of the currently broadcast channel and an identifier of the requested channel to modify MNAT settings on the MNAT router; and redirect the user to the multicast address, the multicast address associated with the requested channel.

In an embodiment, the currently broadcast channel that has no current viewership comprises a source specific multicast (SSM) address. In that embodiment, the request to modify MNAT settings comprises association of the SSM address with a source address associated with the channel. In an additional embodiment, redirection comprises submission of an Hypertext Transfer Protocol (HTTP) redirect to the user. In such an embodiment, the HTTP redirect comprises an HTTP 302 redirect. In a further embodiment, the one or more instructions are further configured to, when executed: receive refreshed data associated with the current channel viewership from the CDN via the second interface, the refreshed data comprising more temporally relevant data associated with the current viewership level than the data associated with the current channel viewership; and store the refreshed data in the storage apparatus.

These and other aspects shall become apparent when considered in light of the disclosure provided herein.

BRIEF DESCRIPTION OF THE DRAWINGS

FIG. 1e is a functional block diagram illustrating a second exemplary packetized content delivery network architecture useful with various aspects of the present disclosure.

FIG. 8 is an exemplary table 800 representing values in a provisioning table as illustrated in FIG. 7.

Figure 1:
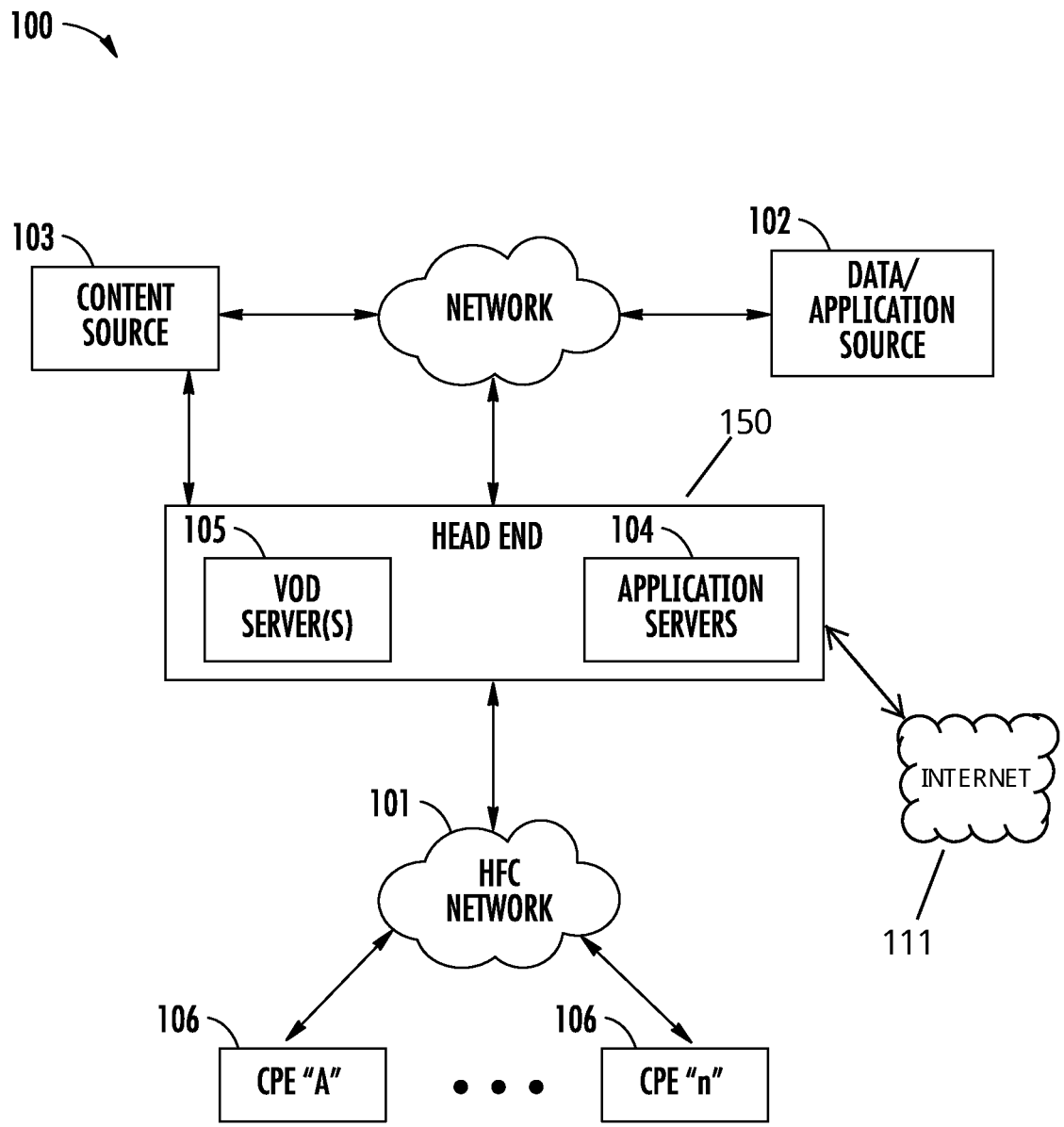
FIG. 1 is a functional block diagram illustrating an exemplary hybrid fiber network configuration useful with various aspects of the present disclosure.

All figures © Copyright 2015 Time Warner Enterprises LLC All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alfa, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, a multicast video program switching (MVPS) design is disclosed. In one exemplary embodiment, the MVPS design is intended to take inventory of digital content manager (DCM) sources and provide consistent multicast stream to encoders, packagers (e.g., Just in Time Packagers (JITP)), multiplexers, encryption servers, content distribution networks (CDN), and origin servers, through an Internet Group Management Protocol (IGMP) v3 proxy. This may eliminate the need to reconfigure the encoders/packagers/multiplexers/encryption servers/CDN/origin servers, change transport stream configurations, or re-assert Protocol-Independent Multicast (PIM) joins to the IGMP v3 routers. The speed and agility of such a solution means that even during brief views during rapid channel changes (i.e., so called "channel surfing") video is available within seconds (or shorter).

The expansion of Internet Protocol (IP) video to include over 2000 local networks and 1,188 Public, Educational, and Government Access (PEG) channels would greatly increase the number of channels currently provided by IP video. Embodiments of the present disclosure leverage various technologies to limit the costs of providing PEG content over IP (such as utilizing a smaller pool of encoders and packagers to provide the same amount of content availability) while still offering full availability of those services.

Embodiments of the present disclosure utilize the reuse of a multicast address according to demand by a user of the system. A state condition is periodically updated so that unwatched publishing points can be but back in the pool for reallocation. Periodically, the number of requests for a particular program channel (e.g., a PEG channel), is checked. When the number of requests is zero, the multicast being used for the encoder is free to be reused by another of the encoders. This advantageously decouples the service/program/channel from the encoder and origin (e.g., a Hyper Text Transfer Protocol (HTTP) Live Stream (HLS) Origin), thus no longer requiring a specific multicast and origin publishing point per service/program/channel.

Further embodiments of the present disclosure include the ability to simultaneously proxy multicast traffic from its source to encoding hardware and keep the Source Specific Multicast (SSM) data intact irrespective of the source. This proxy capability allows for changes in the source to be made on the fly and the ability to Network Address Translation (NAT) the multicast may allow IGMP v3 to function properly on the encoder side.

Additional embodiments of the present disclosure utilize HTTP requests and redirection to perform client redirection (e.g., a 302 redirect) depending on the resulting publish point the program is encoded to. A file or database entry (as is in the POC system) may be updated with the Uniform Resource Locator (URL) for the publish point based on a query result (regarding the service requested), which redirects the user request based on the result of the query to the publish point carrying the requested service.

Various other operational and/or business-related rules are also disclosed.

In addition, security and redundancy schemes may be advantageously deployed consistent with the various aspects disclosed herein.

Detailed Description of Exemplary Embodiments

Exemplary embodiments of the apparatus and methods of the present disclosure are now described in detail. While these exemplary embodiments are described in the context of the previously mentioned hybrid fiber coax (HFC) cable architecture having a multiple systems operator (MSO), digital networking capability, IP delivery capability, and a plurality of client devices/CPE, the general principles and advantages of the disclosure may be extended to other types of networks and architectures that are configured to deliver digital media data (e.g., text, video, and/or audio). Such other networks or architectures may be broadband, narrowband, wired or wireless, or otherwise.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Also, while certain aspects are described primarily in the context of the well-known Internet Protocol (described in, inter alfa, *Internet Protocol DARPA Internet Program Protocol Specification,* IETF RCF 791 (September 1981) and Deering, et al., *Internet Protocol, Version 6 (IPv6) Specification,* IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Bearer Network—

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1a (described in greater detail below), or others, may be used.

The data/application origination point 102 comprises any medium that allows data and/or applications (such as a VOD-based or "Watch TV" application) to be transferred to a distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications enter the network system. Distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that may be accessed by a distribution server 104.

The VOD server 105 and application distribution servers 104 are a part of the headend architecture of the network 100. The headend 150 is connected to an internetwork (e.g., the Internet) 111.

Figure 1A:
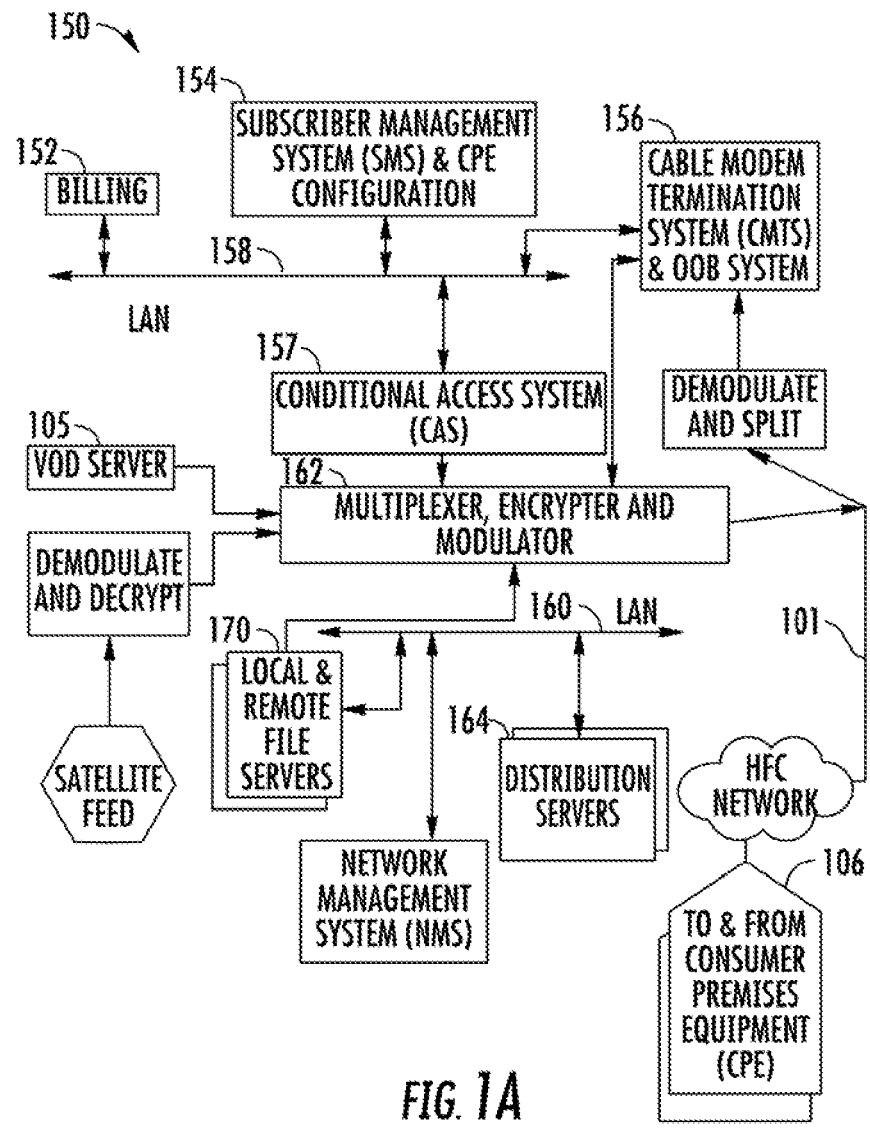
FIG. 1a is a functional block diagram illustrating one exemplary network headend configuration.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
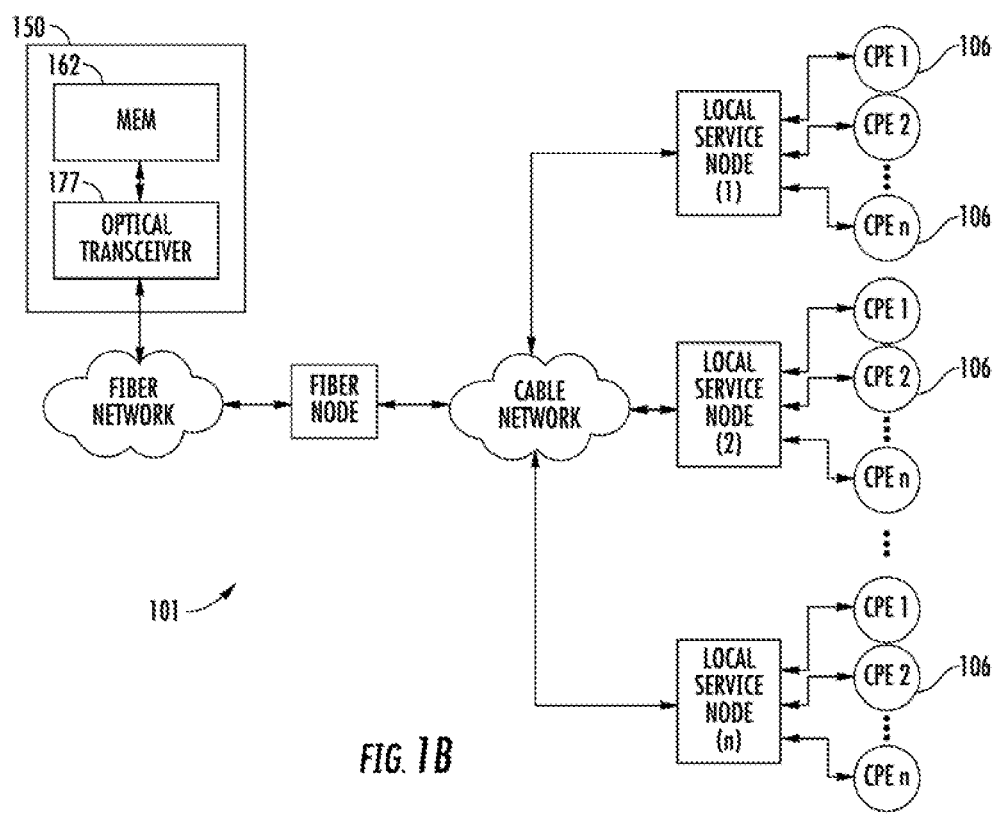
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
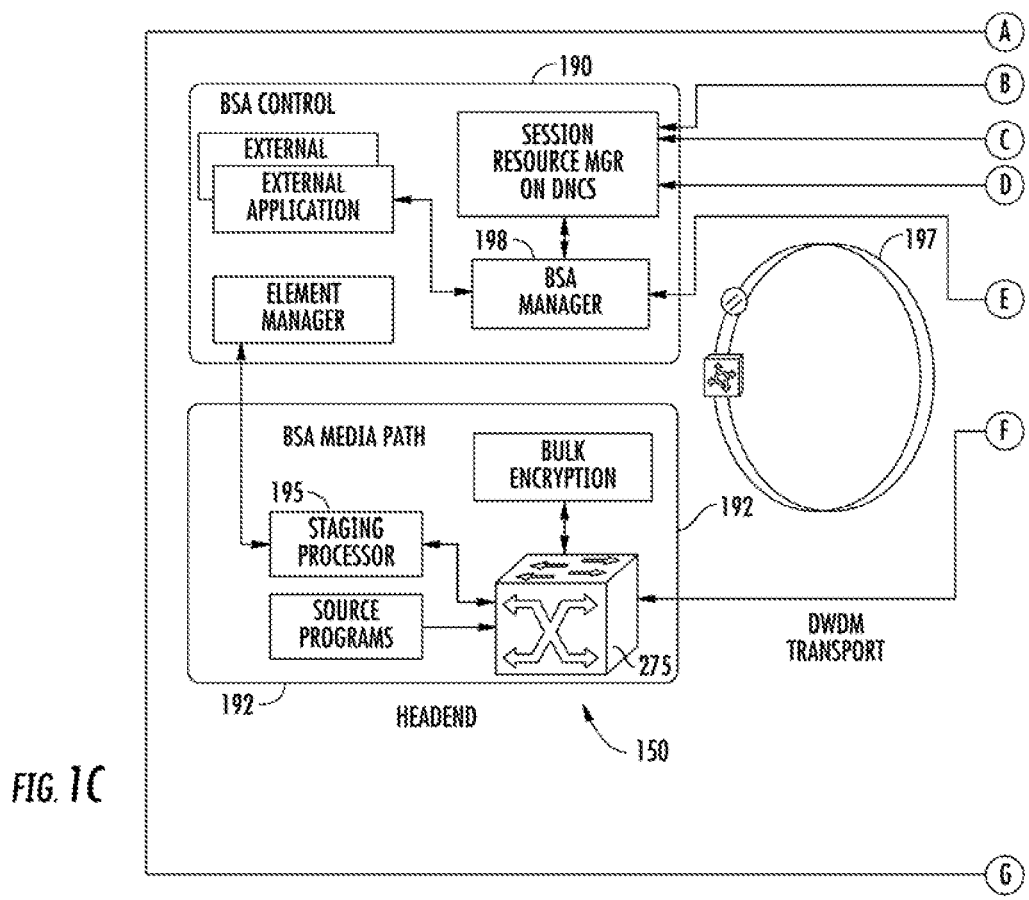
FIG. 1c is a functional block diagram illustrating one exemplary broadcast switched architecture (BSA) network.
Figure 1C:
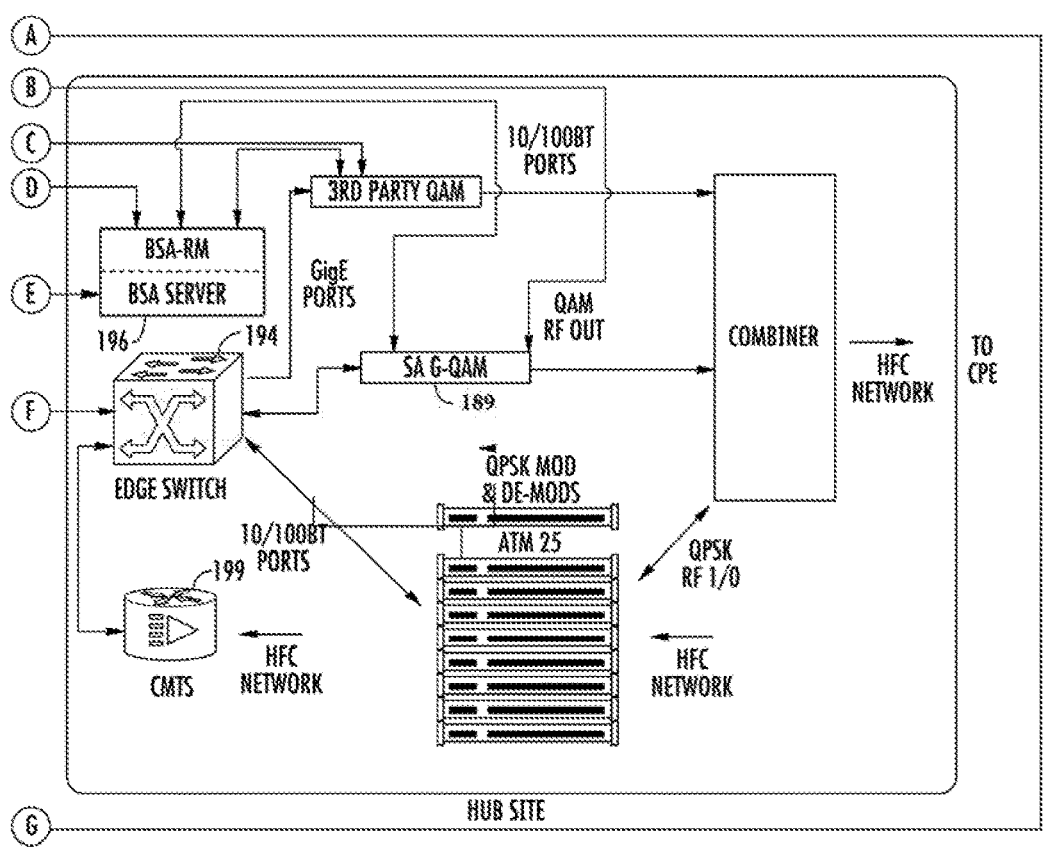

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach may be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alfa improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks—

FIG. 1c illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001, entitled "TECHNIQUE FOR EFFECTIVELY PROVIDING PROGRAM MATERIAL IN A CABLE TELEVISION SYSTEM", issued as U.S. Pat. No. 8,713,623 on Apr. 29, 2014, incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized Networks"—

Figure 1D:
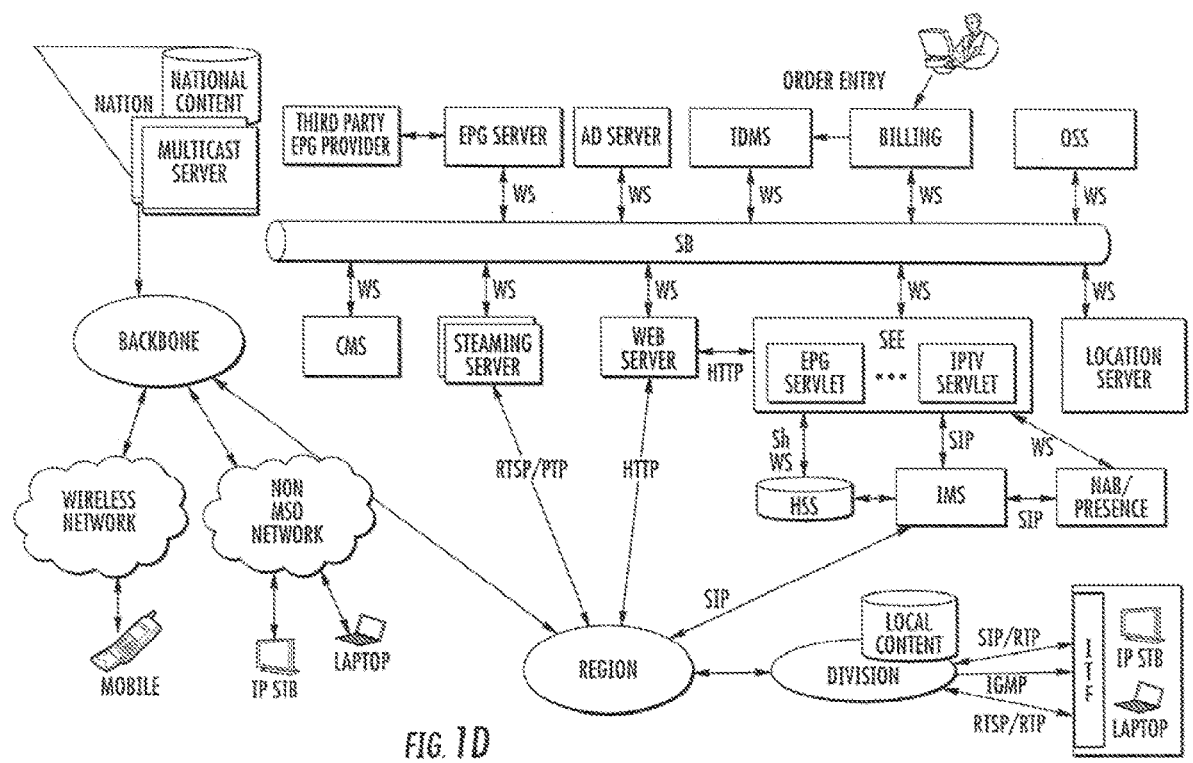
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Referring now to FIG. 1e, another exemplary network architecture for the delivery of packetized content disclosure useful with the present disclosure. In addition to on-demand and broadcast content (e.g., video programming), the system of FIG. 1e may deliver Internet data services using the Internet protocol (IP), although other protocols and transport mechanisms of the type well known in the digital communication art may be substituted.

The network 1000 generally comprises a local headend 1001 in communication with at least one hub 1003 via an optical ring 1007. The distribution hub 1003 is able to provide content to various user devices, CPE 1022, and gateway devices 1020, via a network 1005.

Various content sources 1002 are used to provide content to a content server 1004. For example, content may be received from a local, regional, or network content library as discussed in co-owned U.S. patent application Ser. No. 12/841,906 filed on Jul. 22, 2010, entitled "APPARATUS AND METHODS FOR PACKETIZED CONTENT DELIVERY OVER A BANDWIDTH-EFFICIENT NETWORK", issued as U.S. Pat. No. 8,997,136 on Mar. 31, 2015, which is incorporated herein by reference in its entirety. Alternatively, content may be received from linear analog or digital feeds, as well as third party content sources. Internet content sources 1010 (such as e.g., a web server) provide internet content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1e, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc. subscriber CPE-based session requests, while a different configuration or architecture may be used for servicing mobile client requests. Similarly, the content servers 1004, 1006 may either be single-purpose/dedicated (e.g., where a given server is dedicated only to servicing certain types of requests), or alternatively multi-purpose (e.g., where a given server is capable of servicing requests from different sources).

The network 1000 of FIG. 1e may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

In one exemplary delivery paradigm MPEG-based video content may be delivered, with the video transported to user PCs (or IP-based CPE) over the relevant transport (e.g., DOCSIS channels) comprising MPEG (or other video codec such as H.264 or AVC) over IP over MPEG. That is, the higher layer MPEG- or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

Individual CPEs 1022 of the implementation of FIG. 1e may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more CPE 1022 in communication therewith. Alternatively, the CPE 1022 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 1e, IP packetized content is provided to various user devices via the network 1005. For example, content may be delivered to a gateway apparatus 1020 which distributes content received thereat to one or more CPE 1022 in communication with the apparatus 1020.

In another variant, elements in both the headend and CPE 1022 are specially adapted to utilize transmission infrastructure to transmit and receive both multiplexed wideband content and legacy content as is described in co-owned U.S. patent application Ser. No. 11/013,671 filed on Dec. 15, 2004, entitled "METHODS AND APPARATUS FOR WIDEBAND DISTRIBUTION OF CONTENT", which is incorporated by referenced herein in its entirety. As discussed therein, the CPE 1022 or gateway 1020 of this embodiment may be configured to contain multiple tuners (or a single wide-band tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexes all of the streams resident within the statistical multiplex.

Methods and apparatus for the switched delivery of content may also be utilized consistent with the present disclosure. For example, only that content for which there is at least one request from a user device may be provided. In one embodiment, the methods and apparatus disclosed in co-owned U.S. patent application Ser. No. 09/956,688 entitled "TECHNIQUE FOR EFFECTIVELY PROVIDING PROGRAM MATERIAL IN A CABLE TELEVISION SYSTEM", filed on Sep. 20, 2001, and issued as U.S. Pat. No. 8,713,623 on Apr. 29, 2014, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

In another variant, IP simulcast content and existing on-demand, voice, and broadcast content are all provided to the headend switch device 1008 of FIG. 1e. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced CPE 1022 such as an IP-enabled DSTB may receive the IP simulcast. Legacy CPE may receive content via the gateway device 1020, or via an audio/video "back-up" MPEG transport stream as previously described.

It is further appreciated that content may be delivered to various Worldwide Interoperability for Microwave Access (WiMAX)-enabled mobile devices (e.g., PMD or non-legacy CPE) via a WiMAX distribution hub of the type now ubiquitous in the wireless arts. WiMAX is a wireless technology that provides high-throughput broadband connections over longer distances (as compared to short-range technologies such as WLAN, Bluetooth or PAN). WiMAX can be used for a number of applications, including "last mile" broadband connections, cellular backhaul, hotspot coverage, and high-speed enterprise connectivity, as well as broadband delivery to mobile devices.

Moreover, the aforementioned WiMAX technology may be used in conjunction with a WiMAX-enabled gateway (not shown) or CPE, such that content is delivered wirelessly to the gateway or CPE from the distribution hub, irrespective of the indigenous wired or optical distribution network infrastructure.

In the illustrated embodiment, the gateway device 1020 serves as a gateway to the IP content for other client devices (such as other CPE 1022 and PMD). The gateway device 1020 may communicate with one or more connected CPE 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

In another embodiment, content received at a first user CPE 1022 may be transmitted to CPE 1022 of other premises in a peer-to-peer (P2P) fashion. For example, first content may be requested and received at a first CPE 1022. Then, when a second CPE 1022 in the same region or division requests the same content, the request may be examined by a headend entity (not shown), or the gateway 1020 acting as a peer proxy, to determine that the requesting second device CPE 1022 is entitled to receive the content and that the content is available at the first CPE 1022. The headend entity directs a peer-to-peer communication to be established between the authorized second CPE 1022 and the CPE 1022 having the requested content. It is appreciated that while described herein in the context of a single CPE 1022 providing content to a second CPE 1022, several CPE 1022 having the content thereon may be contacted for simultaneous delivery of the content to one or more second CPE 1022. In one such implementation, the peer-to-peer communication methods and apparatus disclosed in co-owned U.S. patent application Ser. No. 11/726,095 entitled "METHODS AND APPARATUS FOR CONTENT DELIVERY AND REPLACEMENT IN A NETWORK" filed Mar. 20, 2007, which is incorporated herein by reference in its entirety, may be utilized in conjunction with the present disclosure. As discussed therein, these P2P methods and apparatus also advantageously improve the "robustness" or capability of the network with respect to ensuring that subscribers or other users can receive and access desired content when they want, as well as seamlessly repairing or reconstituting damaged or missed portions of that content (including even an entire streamed program, broadcast or download).

It is still further appreciated that the delivery of content may include delivery from an "off-net" distribution hub (not shown) to another network (not shown), not associated with the MSO. In this embodiment, a requesting device (such as CPE 1022 or gateway 1020) may request content from a local headend 1001 which is transferred over both MSO-maintained ("on-net") and "off-net" networks advantageously.

Multicast Video Program Switching (MVPS) System—

Figure 2:
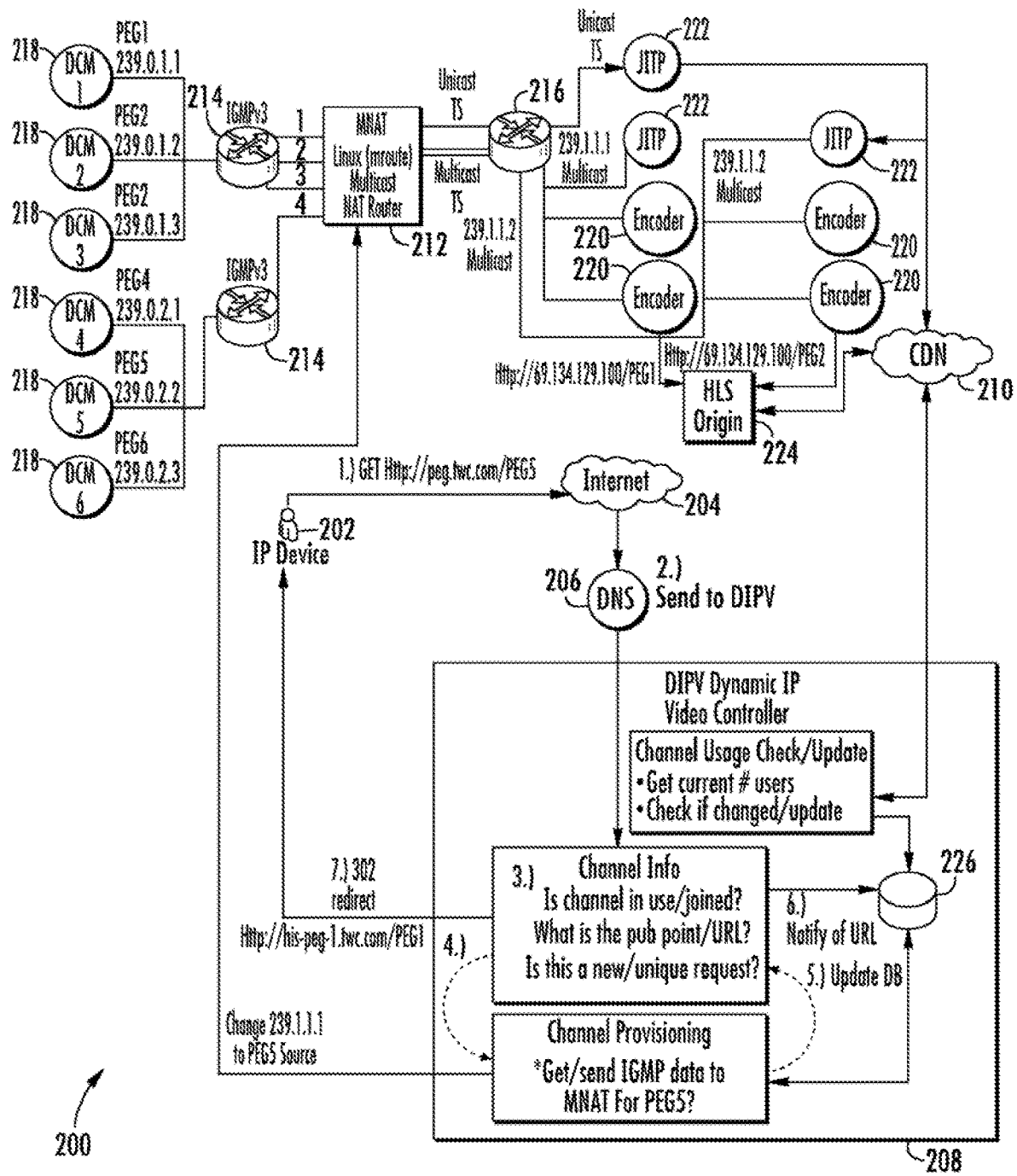
FIG. 2 is an exemplary configuration of a multicast video program switching (MVPS) system useful in conjunction with various principles described herein.

Referring now to FIG. 2, an exemplary configuration of a multicast video program switching (MVPS) system consistent with the present disclosure is illustrated. While described in the context of an Internet Protocol network, it will be recognized that the principles of the disclosure may be extended to other transport modalities and network paradigms.

FIG. 2 discloses an exemplary configuration of an architecture 200 for providing video content to a user device 202 via a connection to a network 204. In one embodiment of the present disclosure, the network 204 comprises an internet, such as e.g., the Internet. The network 204 is also in communication with Domain Name Service (DNS) server 206. The DNS server 206 translates (resolves) a hostname into an IP address. The Dynamic IP Video Controller (DIPV) 208 having at least one database is registered with the DNS server 206 as the resolved IP address for the client requested hostname. The functioning of the DIPV controller 208, DNS 206 and database 226 within the context of content delivery to a user device 202 will be described in further detail below.

In one embodiment, a user makes a request via the user device 202, which passes the request through a home gateway device such as that disclosed in co-owned U.S. patent application Ser. No. 11/818,236 entitled "PREMISES GATEWAY APPARATUS AND METHODS FOR USE IN A CONTENT-BASED NETWORK" filed on Jun. 13, 2007, and issued as U.S. Pat. No. 7,954,131, on May 31, 2011, which is incorporated herein by reference in its entirety. As discussed therein a premises services gateway (PSG) device, which acts as a unified proxy for all inbound (downstream) and outbound (upstream) communications with the network. Client devices may support a cable radio frequency (RF) tuner and an internet protocol (IP) channel distributed over coaxial cable to the PSG. These clients may implement the IP channel, and therefore receive all video or data information over the IP network. The PSG may also be configured to interface with any number of other devices which may be present in the customer's premises, such as e.g., Multimedia over Coax Alliance (MoCA)-based local area networks (LAN), Ethernet LANs, WiFi LANs, Personal Area Networks (PAN), or personal media devices (PMDs). The PSG can also act as a router, provide network address translation (NAT) functions, and even act as a Dynamic Host Configuration Protocol (DHCP) server if so configured. According to this embodiment, the home gateway device passes the request to the DNS 206. In another embodiment, the home gateway device may bypass the DNS 206 via, e.g., using an IP address rather than a domain name and pass the request directly to controller 208.

In another embodiment of the present disclosure, a user of the user device 202 may make a request for a particular service (e.g., a PEG channel) via a URL therefor; for example a request for PEG channel five may comprise a request for the URL: http://peg.twc.com/service.html?service_name=PEG5. The DNS 206 may resolve the URL and direct the request to the MVPS with a query parameter specifying the requested service. The query parameter can be submitted, e.g., via an HTTP "get" or "post" function. In an alternative embodiment, an application program interface (API) endpoint can be used to make a request for a particular service via a URL, for example, http://peg.twc.com/PEG5.

Referring again to FIG. 2, the DIPV 208 is in communication with a Content Delivery Network (CDN) 210 and a Multicast NAT (MNAT) router 212. As illustrated, the MNAT router 212 is in communication with one or more IGMP routers 214 and 216. A first one of the one or more IGMP routers, router 214 is in communication with a plurality of Digital Content Managers (DCM) 218. A second one of the illustrated one or more IGMP routers, router 216 is in communication with one or more encoders 220 and Just in Time Packagers (JITP) 222, which communicate with other encoders 220 and JITPs 222, an HTTP Live Streaming (HLS), HTTP Smooth Streaming (HSS), MPEG-Dynamic Adaptive Streaming over HTTP (DASH) or any other HTTP protocol origin server 224, and the CDN 210. In yet another embodiment, Multicast Listener Discovery (MLD) v1 and/or 2 routers may be used in place of (or to supplement) the IGMP routers 214, 216. Alternatively, the MNAT router 212 may be configured to establish Transmission Control Protocol (TCP)/IP connections. These connections may utilize Real Time Protocol (RTP) or Real Time Streaming Protocol (RTSP) via User Datagram Protocol (UDP), which are multicast supporting protocols. Such an embodiment may not require IGMP and instead using a streaming server to front the sources 218.

As a brief aside, Internet Group Management Protocol (IGMP) is a communications protocol used by hosts and routers on networks (e.g., IP v4) to establish multicast group memberships as described in Request for Comments (RFCs) of the Internet Engineering Task Force (IETF): Cain, et al., *Internet Group Management Protocol, Version* 3, IETF RFC 3376 (October 2002), Vida, et al., *Multicast Listener Discovery Version* 2 *(MLDv2) for IPv6*, IETF RFC 3810 (June 2004), and Holbrook, et al., *Using Internet Group Management Protocol Version* 3 *(IGMPv3) and Multicast Listener Discovery Protocol Version* 2 *(MLDv2) for Source-Specific Multicast*, IETF RFC 4604 (August 2006) each of which is incorporated herein by reference in its entirety. IGMP is a network layer protocol that operates between a client device and a local multicast router. MLD is a (IP v6) protocol for discovering multicast listeners on a directly attached link as described in RFCs 3810 and 4604. Protocol Independent Multicast (PIM) may be used between local and remote multicast routers to direct multicast traffic from a multicast server or digital content manager to many multicast clients as described in S. Bhattacharyya, Ed., *An Overview of Source-Specific Multicast (SSM)*, IETF RFC 3569 (July 2003), Adams, et al., *Protocol Independent Multicast-Dense Mode (PIM-DM): Protocol Specification (Revised)*, RFC 3973 (January 2005), and Handley, et al., *Bidirectional Protocol Independent Multicast (BIDIR-PIM)*, RFC 5015 (October 2007) each of which is incorporated herein by reference in its entirety.

As a further aside, Network Address Translation (NAT) is a scheme of mapping an IP address space into another by modifying network address information in IP packet headers while in transit across a traffic routing device as is described in Rupp, Karl, "*NAT—Network Address Translation*," accessible at: http://www.karlrupp.net/en/computer/nat_tutorial which is incorporated herein by reference in its entirety. Destination NAT (DNAT) is a technique for transparently changing the destination IP address of an end route packet and performing the inverse function for any replies. Source NAT (SNAT) is a technique for transparently changing the source IP address of a packet and performing the inverse function for any replies.

The MNAT router 212 may simultaneously proxy multicast traffic from its source 218 to the encoders 220 and keep Source-Specific Multicast (SSM) information intact irrespective of the source. This proxy capability allows for changes in the source 218 to be made on the fly and the ability to NAT the multicast may allow IGMP v3 to function on the encoder 220 side of MNAT router 212.

Proxying multicast can be accomplished, e.g., via the igmpproxy, smcroute, mrouted, and pimd Linux® (or UNIX) commands. Igmpproxy is a multicast routing daemon which uses IGMP forwarding to dynamically route multicast traffic. Routing is performed by defining an "upstream" interface on which the daemon act as a normal Multicast client, and one or more "downstream" interfaces that serves clients on the destination networks. SMCRoute is a tool used to manipulate multicast routes of the Linux kernel. Mrouted forwards a multicast datagram along a shortest (reverse) path tree rooted at the subnet on which the datagram originates via an implementation of the Distance-Vector Multicast Routing Protocol. Pimd implements the PIM v2 protocol for routing multicast traffic. The foregoing tools may further utilize the iptables command which may be used to set up, maintain, and inspect the tables of packet filter rules in the Linux kernel. These commands also are available on a variety of Linux distributions and may be supported though a support contract (from e.g., Red Hat). Proxying based upon IGMP and/or MLD membership information may also be utilized as described in Fenner, et al., *Internet Group Management Protocol (IGMP)/Multicast Listener Discovery (MLD)-Based Multicast Forwarding ("IGMP/MLD Proxying")*, IETF RFC 4605 (August 2006) which is incorporated herein by reference in its entirety.

Furthermore, Multicast NAT may be implemented in the router 212 that keeps SSM information intact. Such functionality may be implemented using iptables SNAT and/or DNAT implementations. Further functionality may be implemented using "IP Multicast Requirements for Network Address Translator (NAT) and Network Address Port Translator (NAPT)" as described in Wing, et al., *IP Multicast Requirements for a Network Address Translator (NAT) and a Network Address Port Translator (NAPT)*, IETF RFC 5135 (February 2008) which is incorporated herein by reference in its entirety. Both NAT and/or proxying IGMP may be used consistent with embodiments of the present disclosure. Embodiments of the present disclosure utilize modification of inbound source IP addresses while maintaining a static outbound (e.g., to the encoder 220) addressing and video structure.

The encoders 220 and JITPs 222 may be considered as part of an encoder or JITP pool that can be used by a plurality, or alternatively all, of the services 218 depending on whether the service 218 is demanded. Thus, in embodiments of the present disclosure, none of the services 218 are assigned a dedicated encoder 220 or JITP 222. Instead, the system 200 utilizes encoder and/or JITP pools as needed. Since encoders 220 can handle a finite number of services or sources of content 218 at one time (e.g., 5 services/sources) based on processing capability, embodiments of the present disclosure allow the sources 218 to be switched in and out based on user demand. The switching may occur via MNAT routing at the MNAT router 212 such that the encoder 220 or packager 222 can continue to receive a stream of data from a different source 218 without the encoder 220 or packager 222 necessarily aware of the switch in the source 218 of the content. In the context of local network or PEG content (or other content with low viewership), fewer encoder 220 and/or JITP 222 resources are needed to service a large number of content sources 218. Thus, the source 218 addresses remain static and the expected addresses at the encoder 220 remains static but a logical switching occurs at the MNAT router 212 that can change the content that enters each encoder 220. This means that encoders can effectively service a wider pool of sources 218, as long as they are not all being used concurrently, effectively oversubscribing the encoders 220 for certain (e.g. low viewership) content by connecting NAT to the front end of the encoder 220.

As would be understood by those of ordinary skill, the encoders 220 and JITPs 222 by vendors such as Envivio and Ericsson could be utilized consistent with the present disclosure. Furthermore, the encoders 220 and JITPs 222 as discussed in co-owned, co-pending U.S. patent application Ser. No. 14/686,584 filed on Apr. 14, 2015 and entitled "APPARATUS AND METHODS FOR THUMBNAIL GENERATION" and Ser. No. 14/220,021 filed on Mar. 19, 2014 and entitled "APPARATUS AND METHODS FOR RECORDING A MEDIA STREAM", each of which is incorporated herein by reference in its entirety, may be utilized as well.

Referring back again to FIG. 2, the DIPV controller 208 polls the CDN 210 is in communication with the DIPV controller 208.or other client-serving node. The CDN 210 or other serving node may have a record of the state or condition of the encoders 220 and JITPs 222 including information regarding which channels are currently being delivered to users as well as which channels are currently being provided but have no current viewership. These unwatched publishing points are, in one embodiment of the present disclosure, put back into the resource (e.g., encoder 220 and JITP 222) pool for reallocation. Such state conditions can be tracked via a database at the CDN 210 and/or at the controller 208. The DIPV controller 208 may request this state information from the CDN 210 which the CDN 210 provides to the controller 208.

In a further embodiment of the present disclosure, a popularity indexer application (PIA) is utilized. The PIA may utilize customer consumption data to predict what is likely to be watched. The PIA (or a similarly function) may query the CDN 210 to determine the most popular channels for a specific hour then ranks them by number of requests. In one such implementation, the popularity of content can be pre-seeded on client delivery caches as disclosed in co-owned U.S. patent application Ser. No. 13/958,467 entitled "PACKETIZED CONTENT DELIVERY APPARATUS AND METHODS" filed on Aug. 2, 2013, and issued as U.S. Pat. No. 9,467,369 on Oct. 11, 2016, which is incorporated herein by reference in its entirety. As discussed therein content may be deemed as 'popular', and retained (stored) by the cache for faster fulfillment of future requests. The use of second and/or third tier caches advantageously reduces content retrieval from a content server which may reduce delays and/or traffic loads associated with serving content to network clients. Similarly, the PIA or other program may periodically check the number of requests on a particular program.

In a further embodiment, the CDN 210 or other indexing system may also predict that content will be requested by the client at a future time period based on, e.g., previous user requests or requests of content from similarly situated users (e.g., users who are demographically or psychographically similar). For example, content may be selected to align with user preferences as discussed in co-owned U.S. patent application Ser. No. 12/414,576 filed on Mar. 30, 2009, entitled "RECOMMENDATION ENGINE APPARATUS AND METHODS", and issued as U.S. Pat. No. 9,215,423 on Dec. 15, 2015, which is incorporated herein by reference in its entirety. A mechanism for particularly selecting content to align with a user's preferences (the latter which the viewer need not enter manually) is discussed therein. The recommended content may be displayed in one embodiment as a list or table of titles (and related information of interest), or alternatively fed to the user as a continuous content stream on a virtual channel. In another embodiment, the compiled content is presented to the user in conjunction with an electronic program guide (EPG) which may be personalized to that user if desired. In these embodiments, channels recommended may be "preloaded" via the MVPS by ensuring that the recommended content is given encoder 220 and JITP 222 resources despite not having any current viewership. Furthermore, the DIPV controller 208 may select a different channel to remove from an encoder (e.g., that also receives no viewership) as opposed to a recommended channel. This may ensure faster channel load times.

Additionally, in a further embodiment, current state information from alternate sources, such as state information reported to a dashboard view via Simple Network Management Protocol (SNMP) or other systems and protocols may be utilized by the controller 208 to make service availability decisions.

When the number of requests on a particular program is zero, the multicast being used for the encoder is free to be re-used by another of the encoders. This decouples the service/program from any specific encoder 220, JITP 222, and origin 224. This advantageously allows the system to dispense with a need to have a specific multicast and origin publishing point per service. Furthermore, such a method allows for scalability and monitoring since there may be a fixed number of publishing points 218 and multicast addresses that need to be accounted for. For example, a pool of 100 channels with a peak viewership of 30 concurrent programs watched would only need to monitor or stream, about 45 at any given time for a 50% growth spike margin. When the peak hits 40 concurrent streams or programs viewed another 20 publishing point and multicast addresses are added to the pool to keep up with the demand. Furthermore, when it is determined that particularly content is popular or meets a threshold of viewership requests (e.g., a heavily watched PEG channel in a locality), then the particular content source associated therewith is moved (manually or automatically based on relative or absolute popularity and/or relative or absolute demand) to a system with dedicated encoder 220 and JITP 222 resources. Additionally, the encoder 220 and JITP 222 pools may vary in capacity based on predicted demand of channel variety of the MVPS system. Such resources (e.g., encoders 220 and JITPs 222) may be used in varying combinations of High Definition, Low Definition, specific video resolutions, popular/high demand and/or unpopular/low demand services to optimize the encoding and packaging capacity of the pool at any time either predictively or through manual intervention via the MVPS controller.

Furthermore, during periods of relatively high demand for content using the MVPS architecture, the encoders 220 and JITPs 222 can process lower bitrate content streams and thus have a greater number of channels per usable resource. Conversely, when demand is relatively low for content using the MVPS architecture, higher bitrate content streams can be utilized by the encoders 220 and JITPs 222.

In further embodiments, advertisements, Emergency Broadcast System alerts, sports blackouts, or local event announcements could be switched into a stream of content using the MVPS architecture. In some of the aforementioned embodiments, an alert, advertisement, or message may be switched into multiple encoders 220 (or other hardware) effectively switching content viewable on multiple programming channels.

Additionally, the system 200 further includes an HTTP web server. This feature may be comprised as a separate server entity or can be included within the DIPV controller 208. Such a server may take HTTP requests from a user device 202 and redirect the client depending on the resulting publish point the requested program is encoded to. For example, the HTTP request may be over port 80 (or 8080, or any other valid port number) from the client to the web server. In response, the web server sends a 302 redirect message to the requesting device 212 to redirect the device to the requested content (whether the content was already at the redirected URL or whether the controller 208 directs a switch of the requested content for an unwatched piece of content). Other HTTP redirects can be used consistent with the present disclosure such as a 301, 303, and 307 redirects.

In yet another embodiment of the present disclosure, the web server comprises standard web server libraries as would be understood by those having ordinary skill in the art (as are available in industry standard server environments) with custom rules for executing a backend database look-up and redirecting based on the results of that query. For example, back-end processing can be done by Common Gateway Interface (CGI), PHP: Hypertext Preprocessor (PHP), or any other server-side processing and would not need to (but may) be open to any outside communications, and application program interface (API) support for modular processing (e.g. separation of database, routing, and web serving components) may be implemented for function-level redundancy. An embodiment of the present disclosure utilizes an Apache® built-in support for .htmaccess files, which may enable to process to be clean to the user's perspective. The server-side script updates the file with the URL for the publish point based on the query result, and the request is redirected based on the information therein using a standard 302 response. In a further embodiment, the web server comprises a standard Ubuntu 10.4 Linux-Apache-My Structured Query Language (MySQL)-PHP (LAMP) server with the essential-utilities and smcroute packages installed and capable of performing the SSM proxy, HTTP redirect and database hosting functions without any other libraries or modules.

Although the proxy/NAT 212 and database systems 208 are depicted in FIG. 2 as separate entities, in one embodiment they may reside on the same physical hardware and shared operating system (OS). In another variant, two or more network interface controllers (NIC) of 1 or 10 Gbps are utilized depending on the number of services concurrently being watched or provided at peak. For example, a single server with two 1 Gbps NICs can proxy 166 concurrent PEGs at 5.8 mbps. At a viewership rate of 0.004%, which equates to 18 concurrent programs of the approximately 4,500 services available, this single server could grow to nearly 10 times the current estimated utilization level. The server may belong to 2 virtual local area networks (VLANs) in a datacenter. The first may comprise a private (content facing) multicast source network and the second is the public (client facing) VLAN the CDN 210 resides. In such a system the CDN may comprise an Alcatel-Lucent® Velocix (Vx) CDN, however, as is readily understood by those of ordinary skill, various CDN models may be used consistent with the present disclosure.

Methods—

Figure 3:
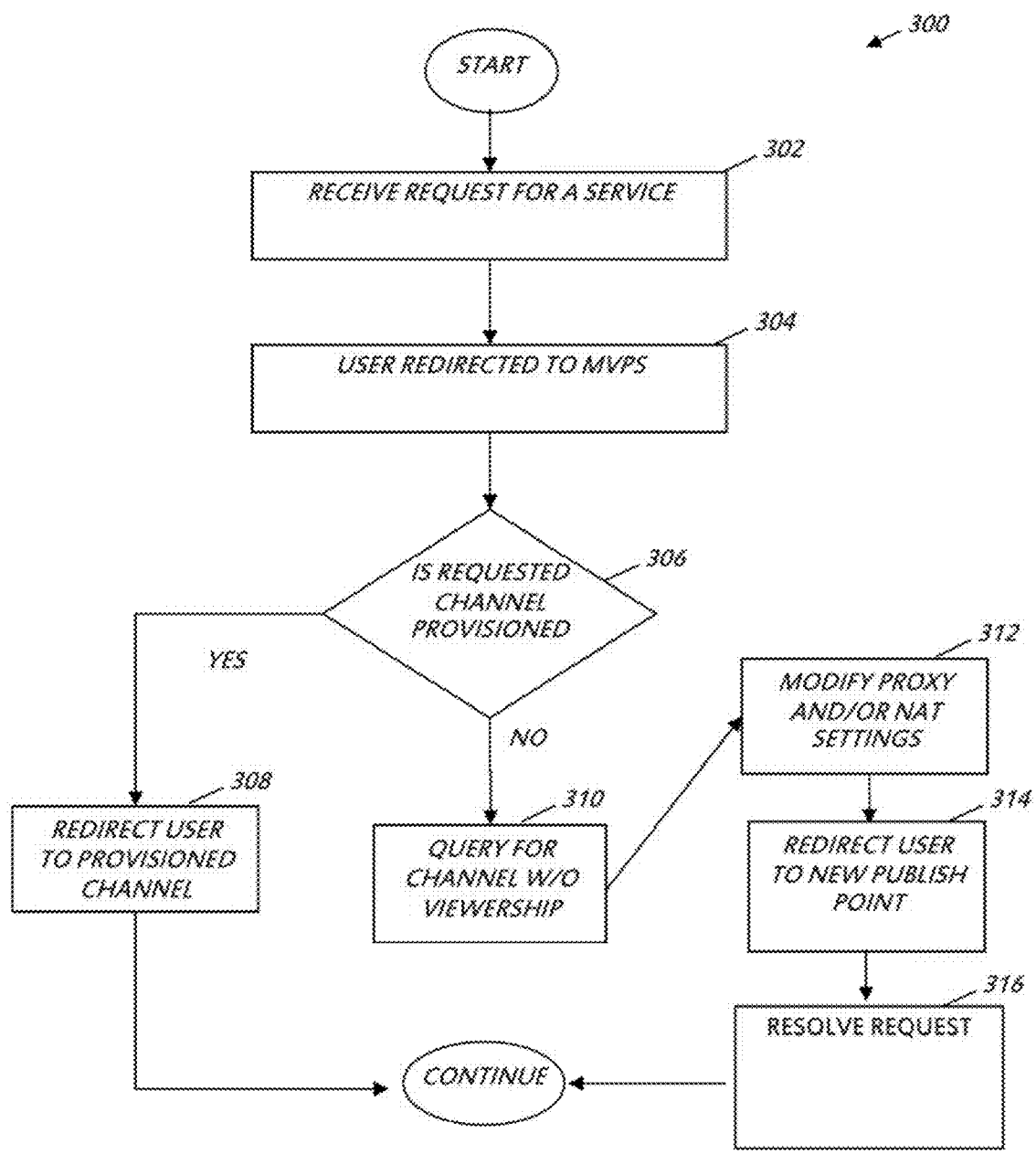
FIG. 3 is a logical flow diagram representing one embodiment of a method for operating an IP video controller according to the present disclosure.

As referenced above, various embodiments of the present disclosure are directed to schemes for providing a multicast stream switching solution that in real time allocates resources to services requested. Referring now to FIG. 3, one embodiment of an exemplary method 300 for operating an IP video controller 208 is disclosed.

At step 302 of the method 300, the controller 208 receives a request from a user device 202 for a particular program channel via a network connection 204. For example, a user may request content via a GET (or alternatively a POST) request (for example via e.g., http://peg.twc.com/PEG5 or over the Internet). At step 304, the user device 202 is redirected to the MVPS system (either via DNS 206 or controller 208) via a URL comprising a query parameter specifying the service being requested.

At step 306, the controller 208 determines whether the requested channel is currently provisioned. This may be determined by the controller 208 via a query to its internal storage or database 226. This state information may either be requested by the controller 208 from the CDN 210 or it may be periodically updated by the CDN 210 without request (or upon state changes). Such state information may be stored in the database 226. The publish point/URL of the requested channel may be determined by the controller 208. The controller 208 may also determine whether the request by the user device 202 is a unique or new request.

When the requested channel is currently being provisioned, at step 308, the controller may send an HTTP 302 redirect to the user device 202 to the publish point that is currently carrying the service. The controller 208 may utilize information gathered at step 306. For example, an HTTP 302 redirect is sent to the user device with the URL http://his-peg-1.twc.com/PEG1.

When the requested channel is not currently being provisioned, at step 310 a query is made to the database 226 to find a currently provided program with no current viewership. The query may also look up the SSM source information of the requested program from the DCMs 218.

At step 312, the SSM source information is used to change/update the proxy and NAT settings at the MNAT router 212 so the downstream encoder 220 gets new content on the stream already established. This may take the form of a request to change (or translate) the multicast address 239.1.1.1 to the PEG5 source. In an embodiment where the controller 208 and the NAT router 212 are logically on the same server apparatus, the request may be between a controller process and a NAT process or may make a change to a translation table directly.

At step 314, the client is redirected to the publish point (e.g. URL) tied to that particular stream. For example, an HTTP 302 redirect is sent to the user device with the URL http://his-peg-1.twc.com/PEG1. At step 316, the address is resolved by the DNS 206 from the publish point URL provided to the CDN 210 for content. In an embodiment, the controller 208 and DNS 206 may be embodied in a single server apparatus.

Exemplary Dynamic IP Video (DIPV) Controller—

Figure 4:
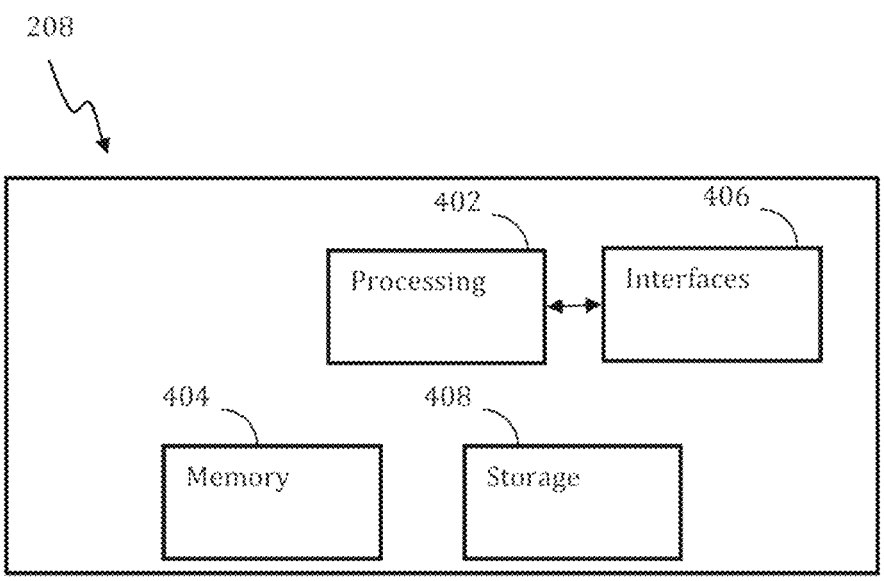
FIG. 4 is a functional block diagram illustrating an exemplary Dynamic IP Video (DIPV) controller useful in conjunction with various principles described herein.

Referring now to FIG. 4, a functional block diagram illustrating an exemplary Dynamic IP Video (DIPV) controller is disclosed. The DIPV controller 208 comprises a processing apparatus 402, memory 404, and is in communication with a Content Delivery Network (CDN) 210, a Multicast NAT (MNAT) router 212, DNS 206, and/or the user device 202 via interfaces 406. Storage 408 may include a database 226 for storage of IGMP data and channel assignments, and channel usage information. It is further contemplated that the controller 208 includes the functionality of MNAT router 212. Functioning of the DIPV controller 208 is disclosed elsewhere herein.

Exemplary Multicast Network Address Translation (MNAT) Router—

Figure 5:
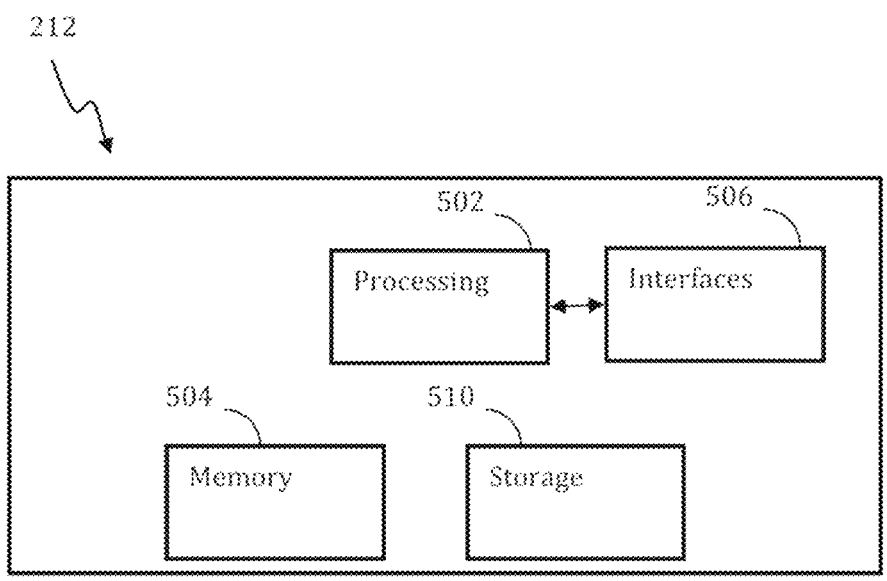
FIG. 5 is a functional block diagram illustrating an exemplary Multicast Network Address Translation (MNAT) router useful in conjunction with various principles described herein.

Referring now to FIG. 5, a functional block diagram illustrating an exemplary Multicast Network Address Translation (MNAT) router is disclosed. The Multicast NAT (MNAT) router 212 comprises a processing apparatus 502, memory 404, and is in communication with a plurality of IGMP routers 214, 216 (and indirectly DCMs 218 and encoder 220 and JITP 222 pools) and DIPV controller 208 via interfaces 506. MNAT router 212 may further comprise storage apparatus 510 which may include NAT tables to perform translation/switching capabilities between a source 218 and encoder 220.

The MNAT router 212 is configured to modify proxy and NAT settings such that a downstream encoder 220 gets new content (from a different source 218) on the stream it already has established. Such modification may be at the direction of the controller 208. MNAT router 212 is further configured to route multicast, unicast, and broadcast content and perform NAT translation between all of these functions. Furthermore, the router 212 may be configured to route TCP and UDP packets. The MNAT router may be further configured to simultaneously proxy multicast traffic from its source 218 to encoders 220 and keep Source-Specific Multicast (SSM) information intact irrespective of the source. In embodiments of the present disclosure, such SSM is stored in NAT tables in memory 504 and/or storage 510.

Security—

In one embodiment, the MVPS web server may be configured as if the server is placed on the Internet with no protection whatsoever and thus should be secured according to best industry practices. For example, the web server may be designed such that no externally visible services runs on them other than http and https. Secure Shell (SSH) may be configured in such a way as to only listen on the management interface, to the exclusion of other services or link addresses. Connections from addresses or subnets may be limited for services expressly (i.e. a white list) from which they are expected. In an embodiment of the present disclosure, for services such as HTTP and HTTPS, the web server is limited to connections from "the entire Internet" while services, such as SSH, may be limited to addresses from management stations or facilities only.

Furthermore, security may be implemented using appropriate host level filtering technologies (for instance iptables). The semantics of this security policy may be duplicated in the form of static packet filters on the routers' facing interfaces. Routing information may be communicated between a node and its upstream router as well as between the nodes themselves.

Additionally, access control such as Digital Rights Management (DRM), conditional access (CA), trusted domain (TD), etc. may be implemented by the JITP 222 (or alternatively the CDN 210). One example of utilization of the foregoing technologies is described within co-owned U.S. patent application Ser. No. 13/710,308 filed on Dec. 10, 2012, entitled "APPARATUS AND METHODS FOR CONTENT TRANSFER PROTECTION", and issued as U.S. Pat. No. 9,565,472 on Feb. 7, 2017, which is incorporated herein by reference in its entirety. As discussed therein content is delivered via a managed content distribution network (such as a cable or satellite or HFCu network having an MSO), and the MSO manages the rights and restrictions of the content outside of a premises, and in a data center or headend, by providing requested content to a gateway device within the premises of a user.

All requests and content provided may be encrypted by the (such as via a DES or AES algorithm via a symmetric or asymmetric key approach) prior to transfer over the network and may then be decrypted by the receiving device.

Redundancy—

The MVPS system allows services to be made available when requested, thereby ensuring capacity and availability since the only requests being served from the MVPS system are from users for services they have taken action to view. Furthermore, embodiments of the present disclosure are easy to manage, troubleshoot, update, and operate. To accomplish these goals there can be two approaches taken for redundancy and monitoring system health; functional level or system level. These can be implemented in whole or partially depending on the complexity, which may add vulnerability to any system.

Functional level redundancy and monitoring may be achieved by setting up independent measures and processes for each of the MVPS system components. This would mean, for instance, having a secondary mirrored database instance with logic in the web server code to try this connection if the primary connection to the database failed.

System level redundancy would entail having a full secondary MVPS system behind a load balancing or failover system. This setup may be preferable since it would not require duplicate processes or services on a single server and would be easier to scale by simply cloning another MVPS and adding it to the pool.

For system level redundancy to be effective, the state of the primary system may be periodically verified by either a load balancer or failover mechanism. All the components of the MVPS system may be verified with a Curl URL Request Library (CURL) command of a new, unprovisioned service and verifying the manifest, which may be scripted using any standard shell (or higher) language as is understood by those of ordinary skill.

Database—

Figure 6:
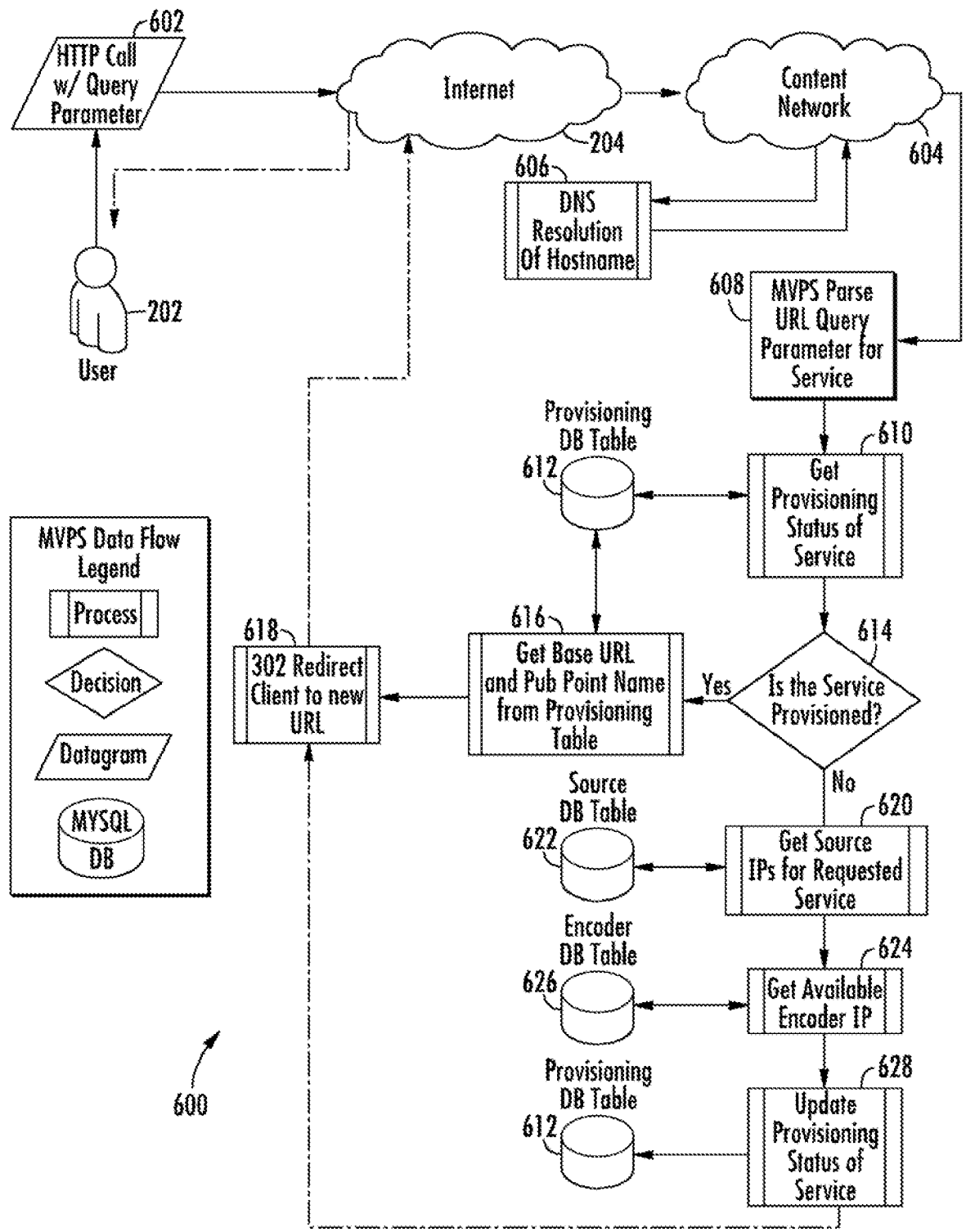
FIG. 6 is an exemplary an exemplary configuration of a portion of an MVPS system useful in conjunction with various principles described herein.

Referring now to FIG. 6, an exemplary an exemplary configuration 600 of a portion of a multicast video program switching (MVPS) system consistent with the present disclosure is illustrated.

A user device 202 may make an HTTP call with query parameter 602 to the MVPS system via the Internet 204. The HTTP call 602 is resolved via DNS servers 206 and the call is routed to the content network 604. DNS resolution of the hostname, at step 606, may occur at the content network 604. The MVPS may parse the URL query parameter for service, at step 608. The MVPS may retrieve the provisioning status of the service, at step 610. The retrieval may be from a provisioning table 612 of the database 226. At step 614, the MVPS may determine whether the requested service is currently provisioned. If the service is currently provisioned (yes branch), the base URL and publish point name is retrieved from the provisioning table 612 at step 616. A 302 redirect redirecting the client 202 to the new URL is sent at step 618.

If the service is not currently provisioned (no branch), at step 620, the source IP addresses for the requested service is retrieved from the source table 622 of database 226. An available encoder IP address is retrieved, at step 624, from the encoder table 626 of database 226. At step 628, the MVPS may update the provisioning status of the service at the provisioning table 612. A 302 redirect may then be sent to the client 202 to send the client 202 to a new URL that is now providing the service, at step 618.

Figure 7:
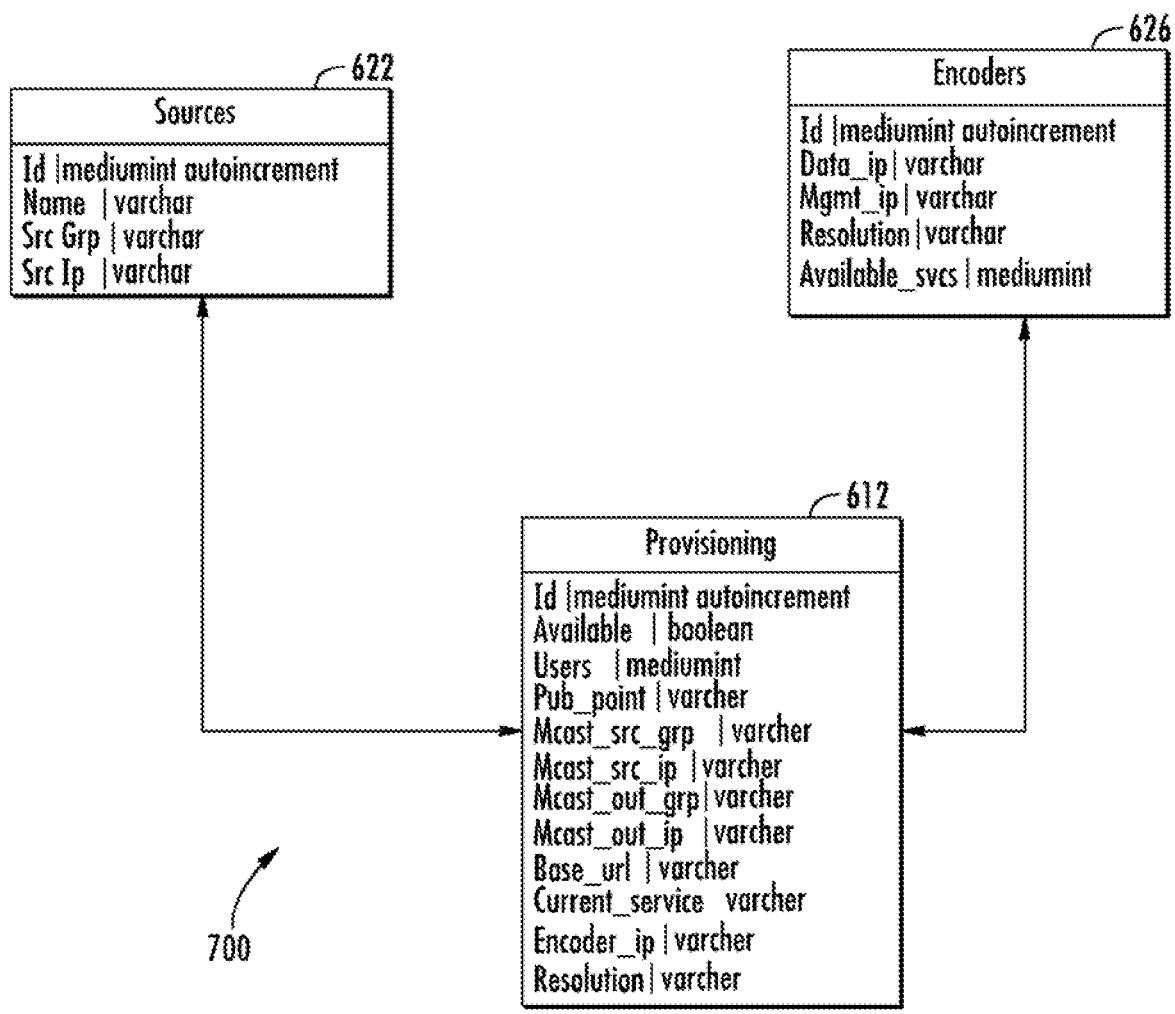
FIG. 7 is a block diagram representing an MVPS database structure useful in conjunction with various principles described herein.

Referring now to FIG. 7, an exemplary diagram 700 representing an MVPS database 226 is illustrated. Three tables from the MVPS database 226 are shown including the sources table 702, the provisioning table 704, and the encoders table 706.

The source table 622 may have a plurality of fields including an identifier (e.g., an auto incrementing integer) that may act as a key value for a service; a name (a variable character field) which may represent the service to be requested; a source group (a variable character field) that may represent the IGMP v3 group IP address; and a source IP (a variable character field) which may represent the IGMP v3 source-specific IP address.

The provisioning table 612 may have a plurality of fields including an identifier (e.g., an auto incrementing medium integer) that may act as a key value; an availability variable (boolean value) that may act as a flag to indicate the provisioning status of the multicast output (used or not used); a number of users (an integer value) which may inform the controller if the service is no longer used and can be placed back into "available" status for reuse; a publish point address (a variable character value) that may represent the name on the encoder or packager the service will be made available to the user using; a multicast source group (a variable character value) that may reflect the source IGMP v3 group IP of the service that's been requested; a multicast source IP address (a variable character value) which may represent the source IGMP v3 source-specific IP address of the service that's been requested by a user; a multicast outbound group (a variable character value) that may represent the outbound multicast address the MVPS will use to deliver the source content to the encoder or packager; a multicast outbound IP address (a variable character value) that may represent the data port IP of the MVPS system; a base URL (a variable character value) that may represent the hostname of the serving system; a current service field (a variable character value) that describes what service a particular publishing point is currently set to; an encoder IP address (a variable character value) that may represent the management IP of the encoder or packager the service is being served from; and a resolution field (a variable character value) that may represent the video quality of the service being used for capacity planning/management by the MVPS controller.

The encoding table 626 may have a plurality of fields including an identifier (e.g., an auto incrementing integer) which may be used as a key value; a data IP address field (a variable character value) that may represent the IP of the network port used to join the IGMP v3 streams from the MVPS; a management IP address field (a variable character value) which may represent the IP address used to manually configure or monitor the encoder or packager; a resolution field (a variable character value) which may determine the dedicated resolution if one is desired; and a field denoting the number of available services (an integer) that would be updated dynamically as services are provisioned or removed from the encoder or packager by the MVPS controller.

Referring now to FIG. 8, an exemplary table 800 representing values in the provisioning table 612 is shown. Each row in the provisioning table 704 represents a single publish point (listed as PEG_1 through PEG_14). The first four rows are listed as having a multicast source address and group addresses because they are associated with a particular service and have current viewership (i.e., a non-zero "users" value). The first three rows a have a non-NULL encoder and resolution values because they are currently being encoded by an encoder at IP address 10.159.2.159. The resolution for each of these content sources are standard definition (SD). Because there is current viewership, the first four rows are not available (boolean false), while the rest of the rows are available (boolean true).

Performance—

In another embodiment of the present disclosure, using a standard bitrate assumption for PEG channels of 3.4 Mbps for the ingress and egress interfaces per service. A single MVPS system with two (2) 1 Gbps interfaces, one ingress and one egress, and a single 100 Mbps management interface would be able to support 294 concurrent services.

The 302 redirection from the MVPS system to the CDN for content delivery would not add more than 5 seconds of start-up time on channel changes and not more than 10 second delay in service content presentation to a user.

The database structure previously disclosed can support over 5,000 records. While, in some embodiments the default value for concurrent HTTP connections on standard web servers is 256, in other embodiments this limit can be raised through configuration changes.

Video or audio quality is not impacted by the proxy functions of the MVPS system as in certain embodiments, the MNAT component simply NATs the multicast stream and performs no modification to the transport stream, video structure, or bitrate of the source.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a router of a content distribution network, the computerized method comprising:
maintaining data corresponding to a network address translation (NAT) table, the NAT table configured to enable translation of a plurality of addresses in a source network to a plurality addresses in a encoding network;
receiving data representative of a request from a computerized video control device to modify the NAT table by modifying a source address associated with a first source of the source network, the first source having at least one requesting viewer, the source address corresponding to a first address within the encoding network, the modifying of the source address comprising translating the source address to an address associated with the encoding network that is different than the first address;
monitoring, via a computerized process, demand by one or more users for an address associated with the encoding network that is different than the first address, the monitoring comprising determining that the demand falls below a prescribed threshold value; and
based on the determining that the demand has fallen below the prescribed threshold value, modifying the data corresponding to the NAT table in response to the request, the modifying comprising translating the source address to the address associated with the encoding network that is different than the first address.

2. The method claim 1, wherein the translating to the address associated with the encoding network that is different than the first address comprises translating to an address associated with a second source, the second source having no current viewership.

3. The method claim 2, wherein:
the computerized video control device is in data communication with a video encoder; and
the modifying the data corresponding to the NAT table comprises effectuating switching of content received by the video encoder from the second source to the first source without modifying the video encoder.

4. The method of claim 2, wherein the first source and the second source are associated with respective ones of different public, educational and/or government access (PEG) channels.

5. The method of claim 1, wherein each of the plurality of addresses in the source network, the plurality of addresses in the encoding network, the source address, and the address associated with the encoding network that is different than the first address, comprise different multicast addresses.

6. The method of claim 5, wherein the NAT table comprises a multicast NAT (MNAT) table.

7. The method of claim 6, wherein:
the source network comprises a first Internet Group Management Protocol (IGMP) router, and the encoding network comprises a second IGMP router; and
wherein the method further comprises utilizing the router of the content distribution network to act as a proxy for at least one of the first and second IGMP routers.

8. The method of claim 1, wherein the first source of the source network comprises a digital content management apparatus.

9. A computerized method of operating a router of a content delivery network, the content delivery network comprising a plurality of different content channels, the computerized method comprising:
maintaining a network address translation (NAT) data structure, the NAT data structure configured to associate a plurality of digital video encoders to respective ones of multicast addresses within a pool of multicast addresses;
monitoring, via a computerized process, demand by one or more users for a given one of the multicast addresses, the given one of the multicast addresses associated with a first of the plurality of digital video encoders; and based at least on the monitoring, dynamically causing modification of the NAT data structure;

wherein the modification comprises associating the given one of the multicast addresses to a second of the plurality of digital video encoders, and disassociating the given one of the multicast addresses from the first of the plurality of digital video encoders.

10. The computerized method of claim 9, wherein the monitoring, via the computerized process comprises monitoring the plurality of different content channels, the plurality of different content channels comprising a prescribed number of channels; and wherein performance of the computerized method introduces a latency, the latency comprising a latency value that is acceptable to users of the content delivery network, the latency value being otherwise unachievable for the prescribed number of channels without performance of the computerized method.

11. The computerized method of claim 10, wherein the monitoring of the prescribed number of channels comprises monitoring a sum of: (i) at least 2000 local network channels, and (ii) at least 1,188 Public, Educational, and Government Access (PEG) channels.

12. The computerized method of claim 9, further comprising:

based on the monitoring, determining that the demand falls below a prescribed threshold value; and based on the determining that the demand has fallen below the prescribed threshold value, causing the modification.

13. The computerized method of claim 9, wherein the associating enables different ones of the pool of multicast addresses to be assigned to ones of the plurality of different content channels; and the computerized method further comprises:

proxying multicast packets associated with at least one of the plurality of different content channels from a respective source thereof to the second digital video encoder without changing Source Specific Multicast (SSM) data associated therewith.

14. The computerized method of claim 9, wherein the causing of the modification comprises causing translation, via the NAT data structure, of the given one of the multicast addresses in a source network to at least one address in an encoding network.

15. Computerized router apparatus for use in a content delivery network, the content delivery network comprising a plurality of different content channels, the computerized router apparatus comprising:

processor apparatus;

network interface apparatus in data communication with the processor apparatus; and storage apparatus in data communication with the processor apparatus, the storage apparatus comprising at least one computer program configured to, when executed on the processor apparatus:

maintain a network address translation (NAT) data structure, the NAT data structure configured to associate a plurality of digital video encoders to respective ones of multicast addresses within a pool of multicast addresses;

monitor, via a computerized process, demand by one or more users for a given one of the multicast addresses, the given one of the multicast addresses associated with a first of the plurality of digital video encoders; and based at least on the monitoring, dynamically cause modification of the NAT data structure, the modification comprising translation, via the NAT data structure, of the given one of the multicast addresses in a source network to at least one address in an encoding network.

16. The computerized router apparatus of claim 15, wherein:

the monitoring, via the computerized process, comprises monitoring the plurality of different content channels, the plurality of different content channels comprising a prescribed number of channels; and a latency is afforded via the computerized router apparatus, the latency comprising a latency acceptable to users of the content delivery network, the latency acceptable to users of the content delivery network being otherwise unachievable for the prescribed number of channels without use of the computerized router apparatus.

17. The computerized router apparatus of claim 16, wherein the monitoring of the prescribed number of channels comprises monitoring a sum of: (i) at least 2000 local network channels, and (ii) at least 1,188 Public, Educational, and Government Access (PEG) channels.

18. The computerized router apparatus of claim 15, wherein the at least one computer program is further configured to, when executed on the processor apparatus:

based on the monitoring, determine that the demand falls below a prescribed threshold value; and based on the determination that the demand has fallen below the prescribed threshold value, cause the modification; and wherein the modification comprises association of the given one of the multicast addresses to a second of the plurality of digital video encoders, and disassociation of the given one of the multicast addresses from the first of the plurality of digital video encoders.

19. The computerized router apparatus of claim 18, wherein the at least one computer program is further configured to, when executed on the processor apparatus:

cause proxy of multicast packets associated with at least one of the plurality of different content channels from a respective source thereof to the second of the plurality of digital video encoders without modification to Source Specific Multicast (SSM) data associated therewith.

20. The computerized router apparatus of claim 15, wherein:

said source network comprises a first Internet Group Management Protocol (IGMP) router and said encoding network comprises a second IGMP router, said first and second IGMP routers in data communication with the computerized router apparatus via the network interface apparatus; and the computerized router apparatus is configured to act as a proxy between said first and second IGMP routers.

* * * * *